Dec. 7, 1948.  H. C. HOUSER  2,455,865
MEASURING INSTRUMENT HAVING AN ADJUSTABLE SCALE
Filed Sept. 9, 1944
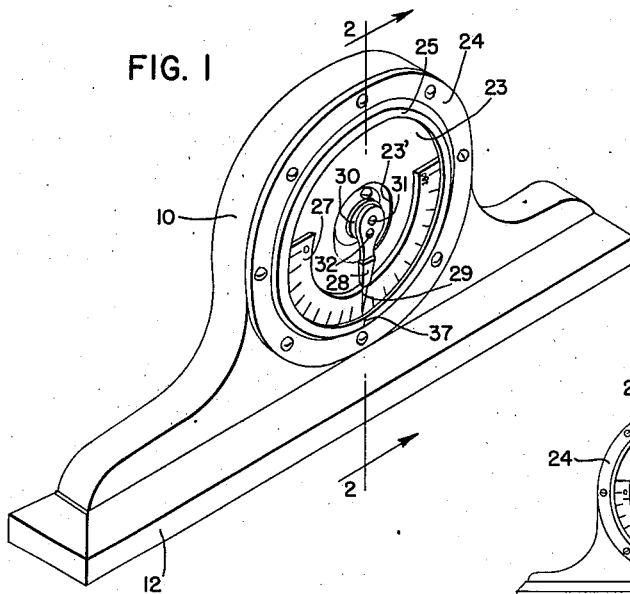
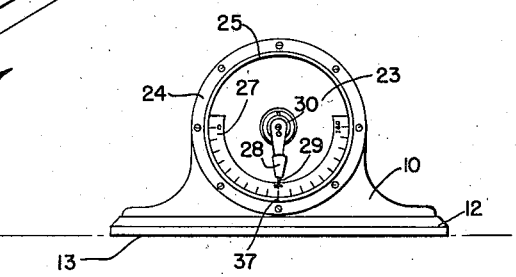
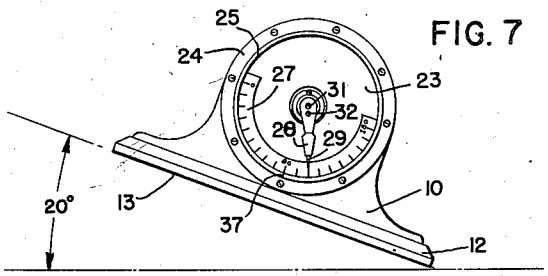
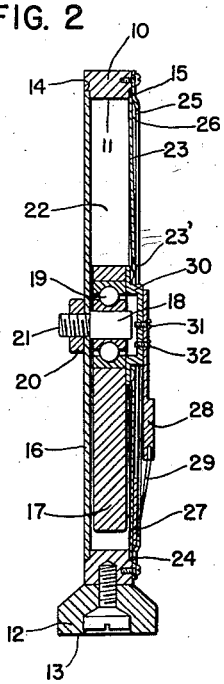
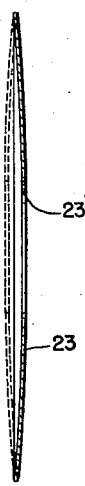
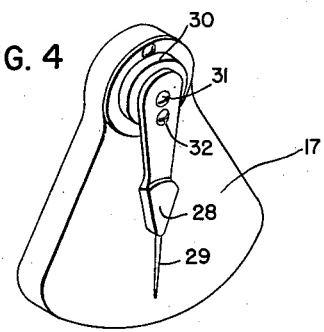
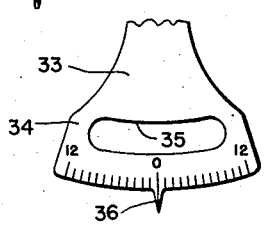
INVENTOR.
HERBERT C. HOUSER.
BY George F. Goodyear
ATTORNEY Patented Dec. 7, 1948

2,455,865

UNITED STATES PATENT OFFICE 2,455,865

MEASURING INSTRUMENT HAVING AN ADJUSTABLE SCALE

Herbert C. Houser, St. Louis, Mo., assignor to Curtiss-Wright Corporation, a corporation of Delaware Application September 9, 1944, Serial No. 553,387

6 Claims. (Cl. 33—215)

This invention relates to measuring instruments and is directed to an automatically operable instrument of the protractor type for measuring angles directly.

The principal object resides in the arrangement of a compact and simple instrument capable of measuring angles quickly and accurately.

It is also an object to provide this instrument with a movable scale member and a flexible diaphragm type scale retaining member so that the scale may be secured against unintended movement until the diaphragm member has been flexed sufficiently to free the scale of frictional restraint.

These and other objects will be noted in the following description which relates to a preferred embodiment of the invention illustrated in the drawing, in which:

Figure 1 is a general perspective view of the instrument which constitutes the basis of the invention, Figure 2 is a sectional elevational view taken at line 2—2 of Figure 1, Figure 3 is a sectional view of the flexible diaphragm member with its reflexed configuration indicated in dotted outline, Figure 4 is a perspective view of the pendulum and scale pointer arrangement, Figure 5 is a fragmentary detail of a modification of the scale pointer to include a vernier scale, and Figures 6 and 7 are face views of the present instrument showing respectively a typical setting of the scale with reference to the horizontal and the measurement of an angle taken from the horizontal.

In the drawing, and particularly Figures 1 and 2, the measuring instrument takes the form of a frame or body 10 having an aperture 11 opening therethrough. This body is suitably mounted on a rectilinear base member 12 in such a manner that the bottom plane surface 13 of the base can be selected as a datum surface to be used in taking measurements.

The body 10 is further formed with counterbored notches 14 and 15 at each side of the central aperture 11. A closure plate 16 is secured in the notch 14 in any suitable manner and a pendulum member or weight 17 is operably mounted on this plate by means of a shaft-like stud 18 and frictionless bearing 19. The stud is fixed on the plate as by the nut element 20 threaded over the rearwardly extending portion 21 thereof as shown in Figure 2. In this manner the pendulum is contained in a body chamber or recess 22 formed by the aperture 11 and the plate 16 and it is constrained to swinging movement within the chamber upon the stud 18.

The pendulum is substantially enclosed in the body chamber by a diaphragm-like plate member 23 provided with an aperture 23' in the zone of the pendulum hub and bearing. This plate 23 is fixed in the notch 15 in any suitable manner and is further held at its peripheral margin by a ring member 24 which, in turn, is detachably carried on the body 10. Furthermore this ring member is formed with a radially inwardly directed flange 25 which is suitably raised or spaced from the face of plate 23 thereby defining a groove 26 of circular extent for the guidance of a scale member 27 which is movably mounted in this groove between the plate 23 and ring flange 25. The scale is provided with a series of graduations, which in this case indicate degrees of angular displacement of the instrument datum surface 13 from the true horizontal or vertical reference axes. However, other indicia may be substituted for that shown.

A particular feature of this instrument resides in the arrangement of the scale 27 for adjustable movement within the groove 26 and in the provision for frictionally retaining the scale in any desired position of adjustment around the circumference of the body. In carrying out this invention the flexible diaphragm-like plate 23 is suitably formed or otherwise shaped to give it a slight but permanent convex set as is clearly indicated in Figure 2 and again in Figure 3 in full line. The flexible characteristic is desired to permit flexing or springing the plate in a reverse direction whereby its normal convexity is temporarily changed to a slight concavity. This flexing feature is clearly shown in Figure 3. Sufficient pressure applied near the central area of this convex plate will produce the concavity or flexing desired. Accordingly, the scale 27 is normally held in frictional contact with the face surface of the diaphragm plate 23 and the inner surface of the retaining flange 25 by the convex curvature of the plate. Accidental displacement of the scale is prevented and hence accurate readings can be made with this instrument. The scale can be shifted or adjusted in its grooved guideway by flexing the plate 23 inwardly toward the pendulum 17 until it becomes flat or slightly concave, at which time the width of the scale guideway is increased and the frictional restraint relieved sufficiently to allow for shiftable adjustment thereof.

The instrument is completed by the assembly of a scale pointer arm 28 on the pendulum member so that a pointer or finger element 29 carried by the arm rides over the scale indicia. The arm 28 is suitably carried on a cup-shaped base member 30 directly attached through the plate aperture 23' to the hub portion of the pendulum 17, as shown in Figures 2 and 4. In addition, initial calibration adjustments of the pointer arm is provided by the use of a centering screw 31 and an offset adjustment screw 32 whereby an exact arm setting can be obtained. This adjustment may be had by providing an oversize aperture in arm 28 for the screw 32. As can be seen in Figure 2 movement of the plate 23 toward the concave position as shown in Figure 3 will result in the plate contacting the pendulum thus restraining it from movement.

A modified scale pointer arm 33 which is shown in Figure 5 may be used in place of arm 28 if a vernier scale is required for more accurate readings. The modified arm includes an enlarged head 34 provided with a laterally directed arcuate slot 35 positioned so that the indicia on scale 27 can be seen as the slotted head 34 moves over the same. Along the lower margin of this vernier head suitable vernier graduations have been marked off to either side of a zero position indicated by the pointer nib 36. The vernier graduations are chosen to give a close reading of the scale graduations in the usual manner and hence no detailed description thereof is believed necessary.

When the instrument is assembled and initially calibrated with the true horizontal reference plane a zero reference mark 37 is suitably scribed on the flange 25 of ring member 24. Thereafter, the scale 27 may be shifted in its guideway as before described, to any desired position with respect to the calibration mark 37 and within the end limits of its graduations. In the present case the scale graduations represent 10 degrees of arc and hence its limits will be zero or one hundred and eighty degrees.

In Figures 6 and 7 the present instrument is shown as being initially adjusted for the reading of any desired angle up to 90 degrees from a horizontal reference plane. It will be observed that angles may be measured in either a clockwise or a counter-clockwise direction. In the example illustrated the instrument has been tilted clockwise through an angle of 20 degrees so that the datum surface 13 is displaced 20 degrees above the horizontal reference plane. With the scale 27 set for alignment of its 90 degree graduation line with the reference mark 37 on member 24 (Figure 6) it will be clear that the 20 degrees of rotation of the instrument will cause the needle 29 to swing to the left a corresponding amount and thus give a direct reading of 20 degrees. In all cases the pendulum will remain in a vertically pendant position and thus the scale 27 will actually move relative to the scale pointer arm 28.

Obviously certain modifications can be made herein without departing from the invention in any way and it is the purpose to cover all such modifications in the appended claims.

I claim:

1. A measuring instrument comprising a body member having a circular aperture therethrough, a ring member secured to the body member around the aperture, a convexly formed flexible diaphragm secured between said members, a scale frictionally retained between the convex side of said diaphragm and one of said members, said scale being movable relative to said members upon flexing of said diaphragm from its normally convex configuration.

2. A measuring instrument comprising a body having a circular aperture therethrough, a ring secured to the body around the aperture, a convexly formed flexible diaphragm secured between the ring and the body, the ring refining with the convex face of the diaphragm a groove, a scale member mounted in said groove and frictionally restrained against movement therein by said diaphragm, said scale being movable in said groove upon flexing of the diaphragm, said scale being movable in said groove upon flexing of the diaphragm from its normal convex configuration.

3. A measuring instrument comprising a body having a circular aperture therethrough, a convexly formed flexible diaphragm having a central aperture provided therein for passing a pointer supporting member, a movable scale, a scale retaining member secured to said body around the aperture thereof and defining with the convex side of said diaphragm a circular groove in which said scale is normally frictionally held from movement, said scale being movable upon flexing of said diaphragm from its normal convex configuration.

4. In a measuring instrument, a flexible diaphragm normally of convex configuration, the periphery of the diaphragm being secured to a ring which defines with the convex face of the diaphragm a circular groove, a scale mounted in said groove and frictionally restrained against movement therein by pressure exerted by said convex face, said scale being movable in said groove upon flexing of the diaphragm from its normal convex configuration to remove said pressure.

5. In a measuring instrument, a diaphragm normally of convex configuration and flexible to concave configuration, the periphery of the diaphragm being secured to a ring which defines with the normally convex face of the diaphragm a circular groove, the diaphragm having a central aperture for passing a pointer supporting member, a scale mounted in said groove for cooperation with such a pointer, said scale being restrained against movement in said groove by pressure exerted by said convex face and being movable in said groove upon flexing of the diaphragm to a concave configuration to remove said pressure.

6. A measuring instrument comprising a body having a circular opening therein, a pendulum mounted in the body opening for swinging movement relative thereto, a normally convex diaphragm having a central aperture provided therein, said diaphragm being secured at its periphery to said body and being flexible to a concave configuration, a pointer supporting member connected to said pendulum and passing through the central aperture in the diaphragm, a movable scale, a scale retaining member secured to said body and defining with the normally convex side of said diaphragm a circular groove in which said scale is normally frictionally held against movement, said scale being movable upon flexing of said diaphragm when in said concave configuration engaging the pendulum for restraining it against movement.

HERBERT C. HOUSER.

REFERENCES CITED

The following references are of record in the file of this patent:

UNITED STATES PATENTS

| Number | Name | Date |
| --- | --- | --- |
| 328,881 | Deckard | Oct. 20, 1885 |
| 794,659 | Brodton | Jan. 11, 1905 |
| 841,598 | Stricker | Jan. 15, 1907 |
| 857,991 | Gibson | June 25, 1907 |

Certificate of Correction

Patent No. 2,455,865.

December 7, 1948.

HERBERT C. HOUSER

It is hereby certified that error appear in the printed specification of the above numbered patent requiring correction as follows:

Column 4, lines 6, 7 and 8, claim 2, strike out the comma and words ", said scale being movable in said groove upon flexing of the diaphragm";

and that the said Letters Patent should be read with this correction therein that the same may conform to the record of the case in the Patent Office.

Signed and sealed this 22nd day of March, A. D. 1949.

[SEAL]

THOMAS F. MURPHY,
*Assistant Commissioner of Patents.*